(12) United States Patent  
Sherlock

(10) Patent No.: US 9,180,778 B2  
(45) Date of Patent: Nov. 10, 2015

(54) MULTI-LANGUAGE MONITOR

(75) Inventor: Lance R. Sherlock, Asbury, IA (US)

(73) Assignee: DEERE & COMPANY, Moline, IL (US)

(*) Notice: Subject to any disclaimer, the term of this patent is extended or adjusted under 35 U.S.C. 154(b) by 1045 days.

(21) Appl. No.: 13/285,356

(22) Filed: Oct. 31, 2011

(65) Prior Publication Data

US 2013/0110495 A1 May 2, 2013

(51) Int. Cl.
*G06F 17/20* (2006.01)
*B60K 35/00* (2006.01)

(52) U.S. Cl.
CPC .......... *B60K 35/00* (2013.01); *B60K 2350/1004* (2013.01); *B60Y 2200/41* (2013.01); *G06F 17/20* (2013.01)

(58) Field of Classification Search
CPC ............................... B60K 35/00; G06F 17/20
USPC ............................................................ 704/8
See application file for complete search history.

(56) References Cited

U.S. PATENT DOCUMENTS

| | | | | |
|---|---|---|---|---|
| 5,303,163 | A * | 4/1994 | Ebaugh et al. | 700/274 |
| 5,739,747 | A * | 4/1998 | Flick | 340/426.15 |
| 5,917,484 | A * | 6/1999 | Mullaney | 715/703 |
| 6,154,673 | A * | 11/2000 | Morgan et al. | 607/5 |
| 6,667,726 | B1 * | 12/2003 | Damiani et al. | 345/1.1 |
| 6,754,668 | B2 * | 6/2004 | Noble et al. | 1/1 |
| 7,113,904 | B2 * | 9/2006 | Litster et al. | 704/8 |
| 2002/0133523 | A1 * | 9/2002 | Ambler et al. | 707/536 |
| 2003/0046526 | A1 * | 3/2003 | Zhang et al. | 713/1 |
| 2006/0178865 | A1 * | 8/2006 | Edwards et al. | 704/1 |
| 2006/0242202 | A1 * | 10/2006 | Li | 707/104.1 |
| 2007/0017971 | A1 * | 1/2007 | Im | 235/379 |
| 2008/0284678 | A1 * | 11/2008 | Randel et al. | 345/55 |
| 2009/0112574 | A1 * | 4/2009 | Zou | 704/8 |
| 2010/0102945 | A1 * | 4/2010 | Watson et al. | 340/462 |

OTHER PUBLICATIONS

Honda, "Honda Pilot Owner's Manual", 2004.*

* cited by examiner

*Primary Examiner* — Jialong He

(57) ABSTRACT

A monitor for a vehicle displays multiple language choices upon the operation or activation of one or more devices (usually buttons). When a language choice is made, the monitor displays all subsequent screens in the selected language.

12 Claims, 5 Drawing Sheets

MULTI-LANGUAGE MONITOR

FIELD OF THE INVENTION

The invention described and claimed herein relates to a method and apparatus for displaying information on a monitor of a vehicle and, in particular, to a method and apparatus for displaying such information in multiple languages.

BACKGROUND OF THE INVENTION

Work vehicles are conventionally equipped with display monitors which communicate machine status to the operator, i.e., display vehicle information. These monitors allow the same electronics to be used in different markets, markets which often require the information to be displayed in different languages. Conventional monitors may include a number of different languages through which the vehicle information may be displayed but the language setting choices are buried deep within the menu structure making it difficult for an operator to navigate when the initial display language is one that is not understood.

SUMMARY OF THE INVENTION

The invention described herein has, among other things, overcome the limitations of conventional display monitors for construction vehicles by displaying a list of language choices in their respective languages upon the operation of one or more typical operational selectors, i.e., switches, buttons, icons, etc. This is done without the need for multiple menus. In this manner, the operator may, upon completing the simple act of operating an operational selector, view the language of choice in the operator's own language and, thereby, easily make a language selection.

DESCRIPTION OF THE PREFERRED EMBODIMENT

Figure 1:
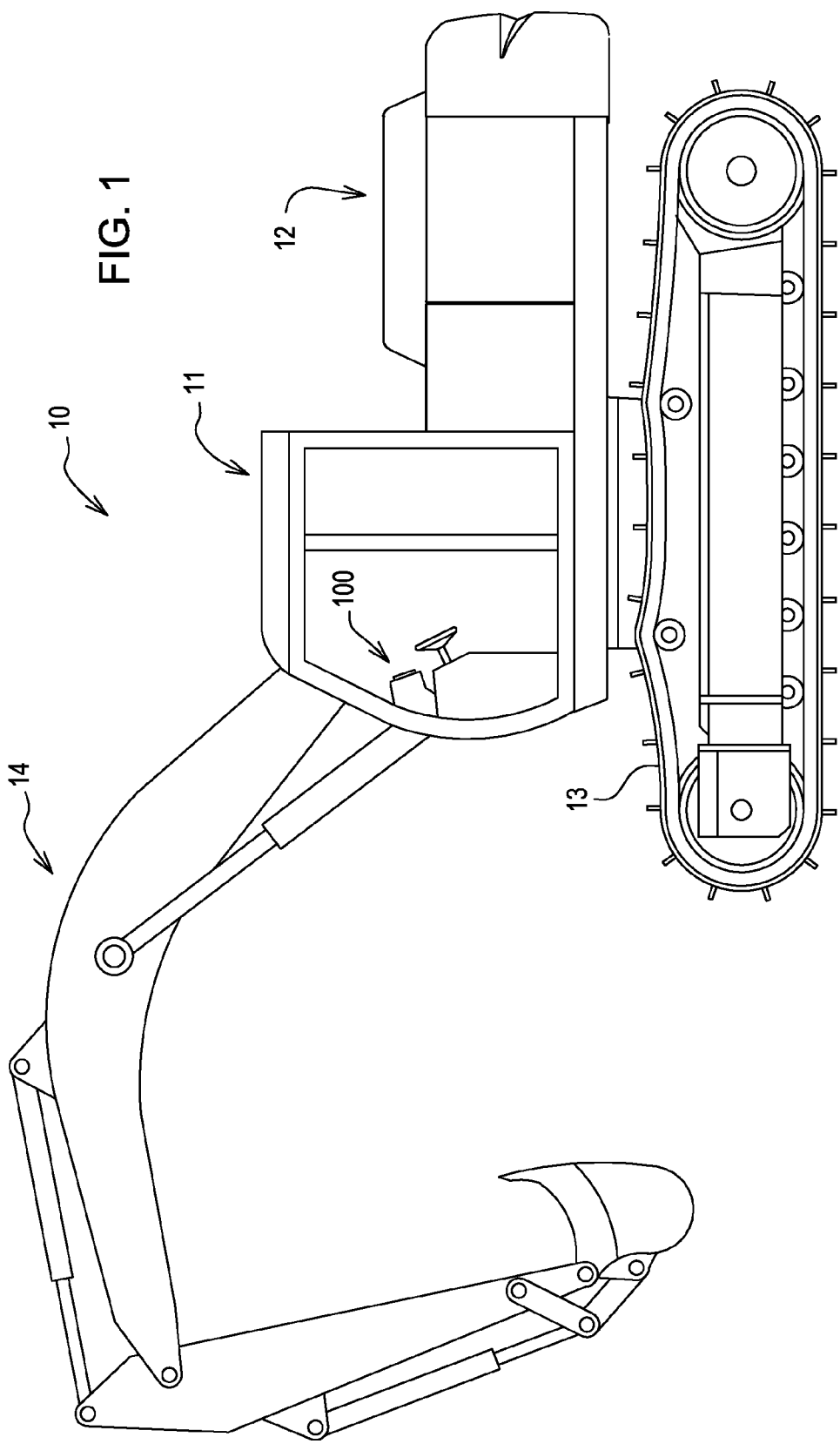
FIG. 1 illustrates an exemplary embodiment of a work vehicle utilizing the invention, i.e., the multi-language display system.

FIG. 1 illustrates an exemplary embodiment of a work vehicle which uses the invention. The work vehicle which is, in this particular case, an excavator 10 includes: a cab 11; a frame 12; an undercarriage 13; supporting the frame 12; a linkage 14; and a multi-language display system 100 which includes a display monitor 110.

Figure 2:
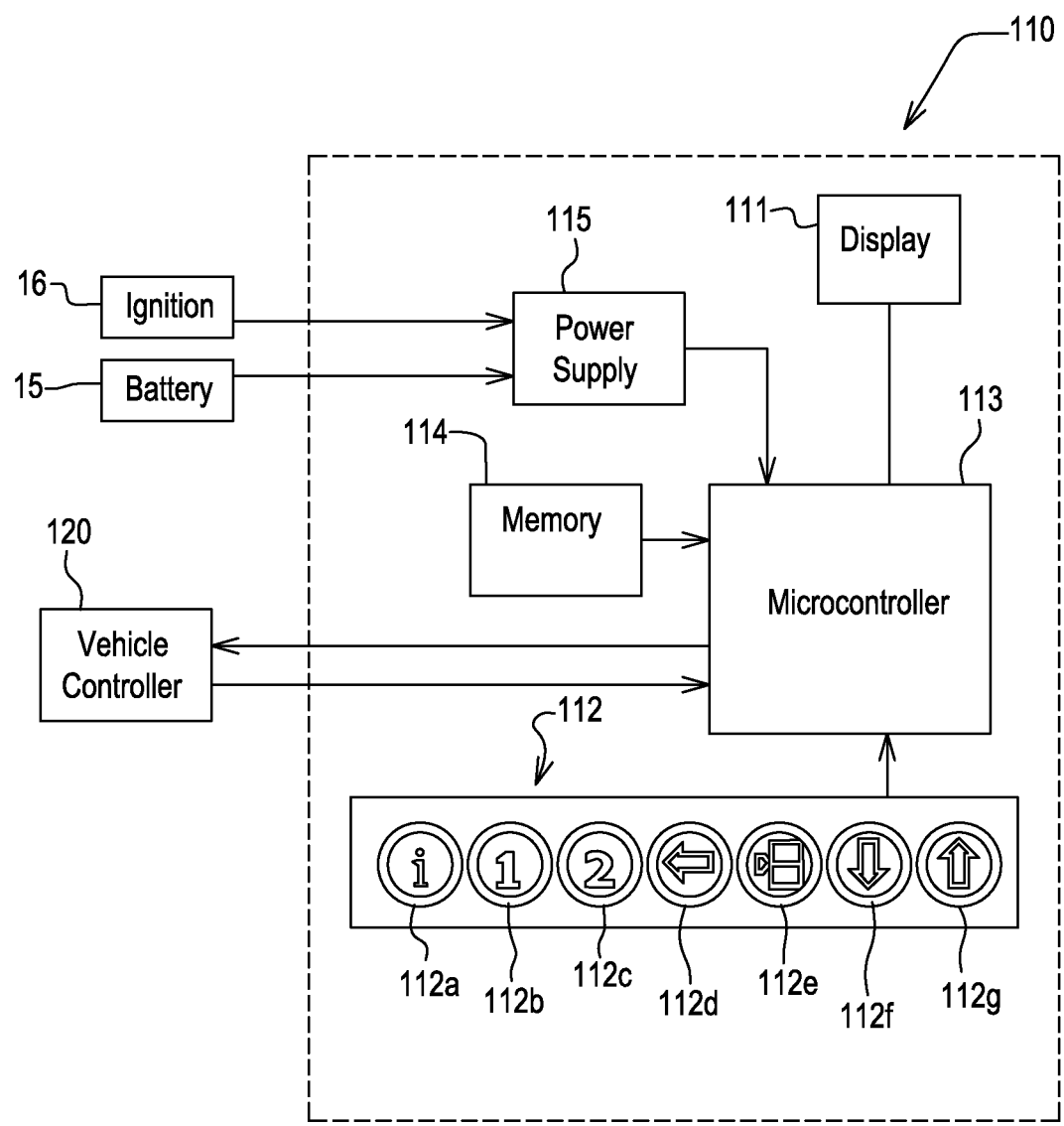
FIG. 2 illustrates and exemplary embodiment of a diagram for the multi-language display system.

FIG. 2 illustrates an exemplary embodiment of a diagram for the multi-language display system 100 which includes a conventional battery 15, a conventional ignition 16 having an "ignition on state" in which power flows to the multi-language display system 200 and an "ignition off state" in which power does not flow to the multi-language display system 100, the display monitor 110, the vehicle controller 120, a microcontroller 113 in communication with the vehicle controller 120 and operably connected to the display monitor 110, a memory device 114 in communication with the microcontroller 113, a conventional power supply 115, and operational selectors 112a-112b which, in this exemplary embodiment, includes: an information button 112a; a "1" button 112b; a "2" button 112c; a left arrow button 112d; a menu button 112e; a down arrow button 112f; and an up arrow button 112g. The memory storage device 114, which may, in this embodiment, be a USB memory stick may house, inter alia, programming, i.e., software, and language content, which may load when the ignition 16 is in the ignition on state. Note that all of the components are interconnected and that the battery 15 is the only self powered component. Thus, the multi-language monitor 110 and the vehicle controller 120 are powered only when the ignition 16 allows electrical power from the battery 15 to flow to them, i.e., only when the ignition is in the ignition on state.

In the described embodiment, any one of the buttons 112a-112g, i.e., operational selector(s), or combination thereof, is "activated" when merely pressed; and "operated" when pressed for a predetermined length of time such as, for example, five (5) seconds.

Figure 3:
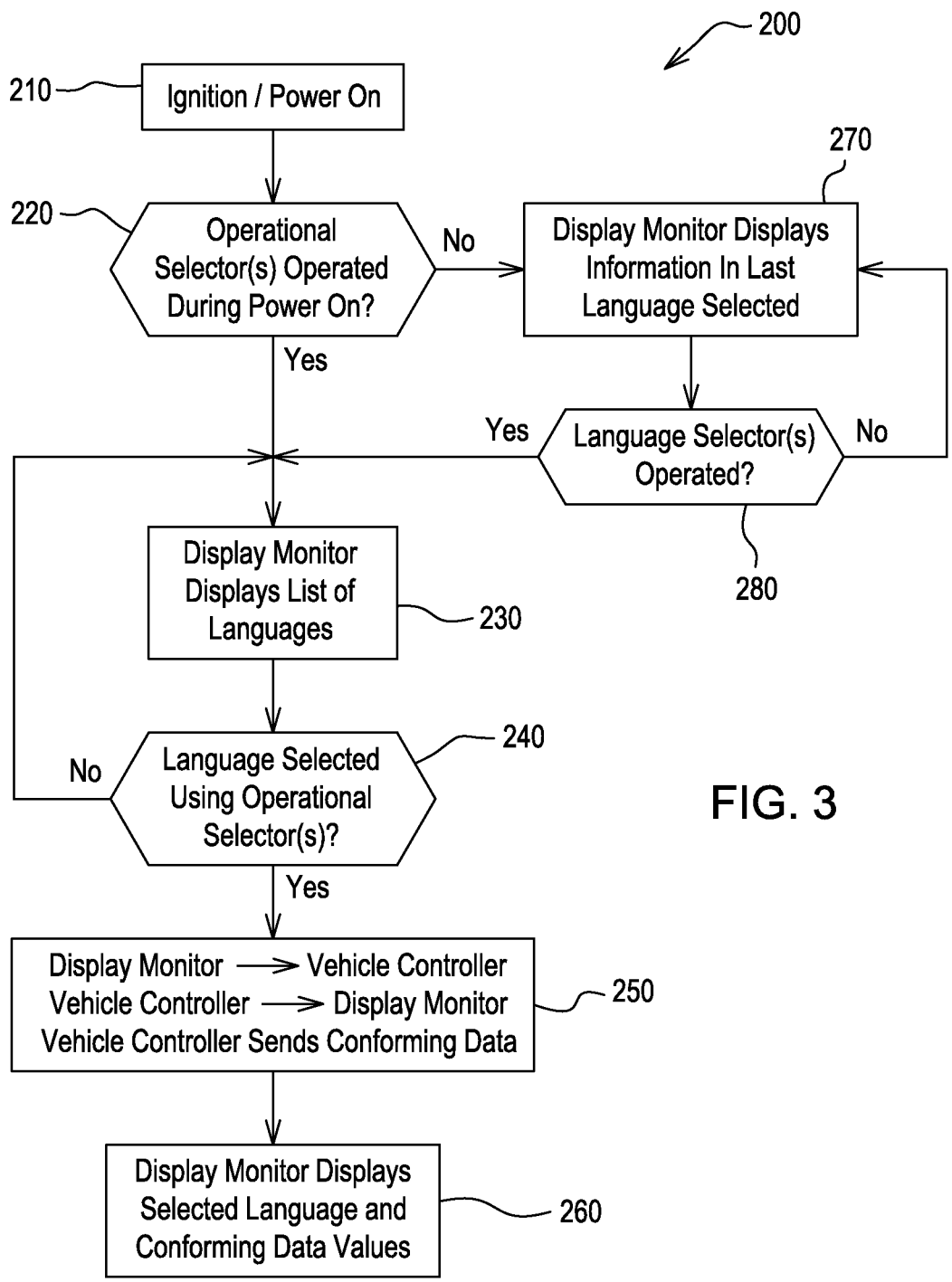
FIG. 3 illustrates an exemplary flowchart of the invention.
Figure 4:
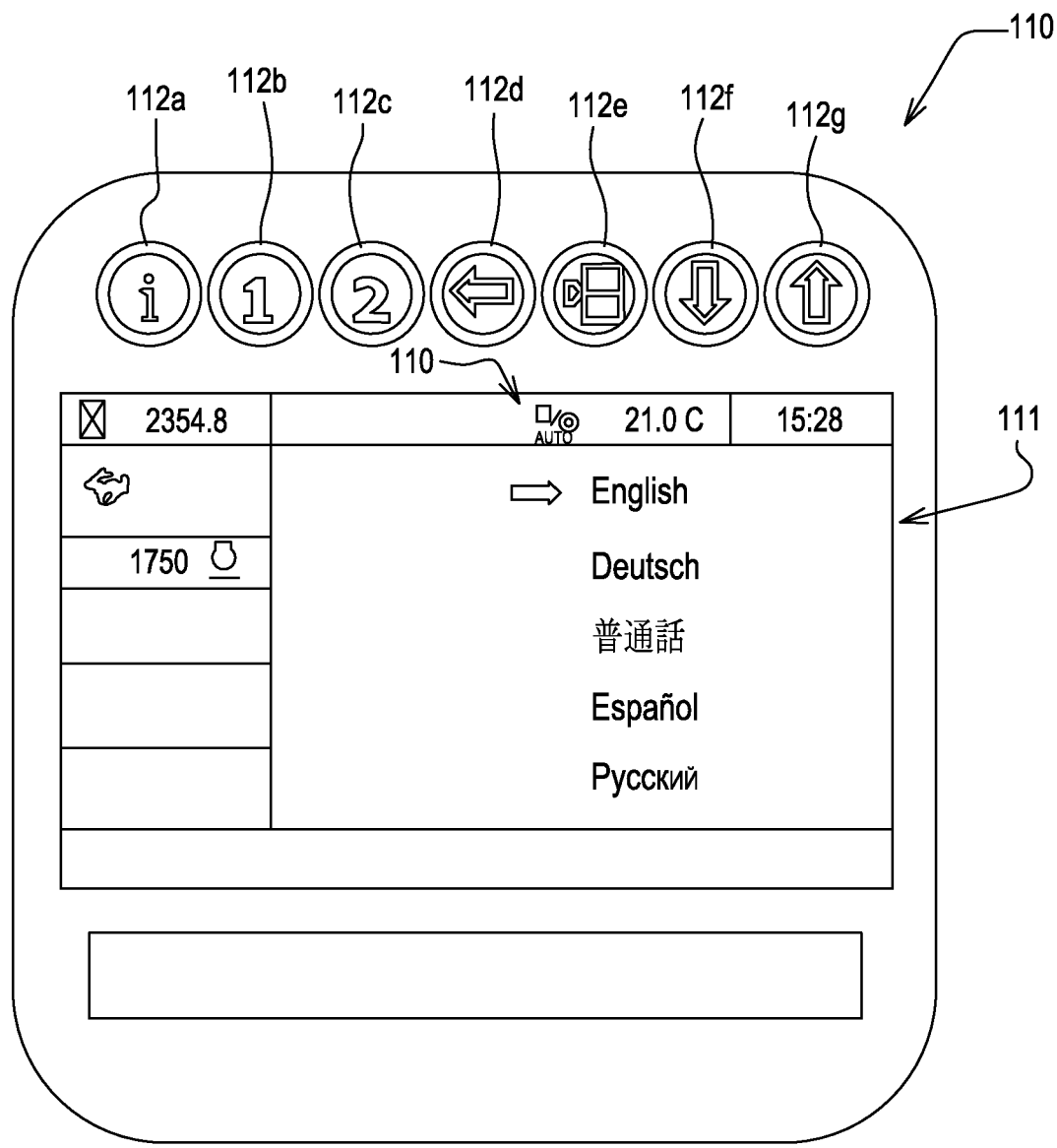
FIG. 4 illustrates an exemplary menu of language choices.

FIG. 3 illustrates an exemplary flowchart 200 for the invention. As illustrated, when the ignition 16 is turned on, i.e., when the ignition 16 is placed in the ignition on state, at step 210, the display monitor 110 may determine if a language menu has been requested at step 220, i.e., if at least one of the operational selectors 112a-112g was activated at the time the ignition 16 entered the ignition on state. If at least one of the operational selectors 112a-112g, such as, for example, the menu selection button 112e, was activated when the ignition 16 entered the ignition on state, the multi-language display monitor 110 may, via programming, display a list of available languages on the liquid crystal display 111 at step 230 as illustrated. In the displayed list, the last selected language may appear highlighted as illustrated in FIG. 4. The list may be scrolled through using operational selectors 112f, 112g, i.e., up and down arrow buttons. A language may be selected at step 240 by activating one of the operational selectors 112a-112e such as, for example, the menu selection button 112e. As illustrated in FIG. 3, the language menu will continue to be displayed at step 230 until either a language is selected at step 240 or the ignition 16 is turned off, i.e., the ignition 16 is in the ignition off state.

Figure 5:
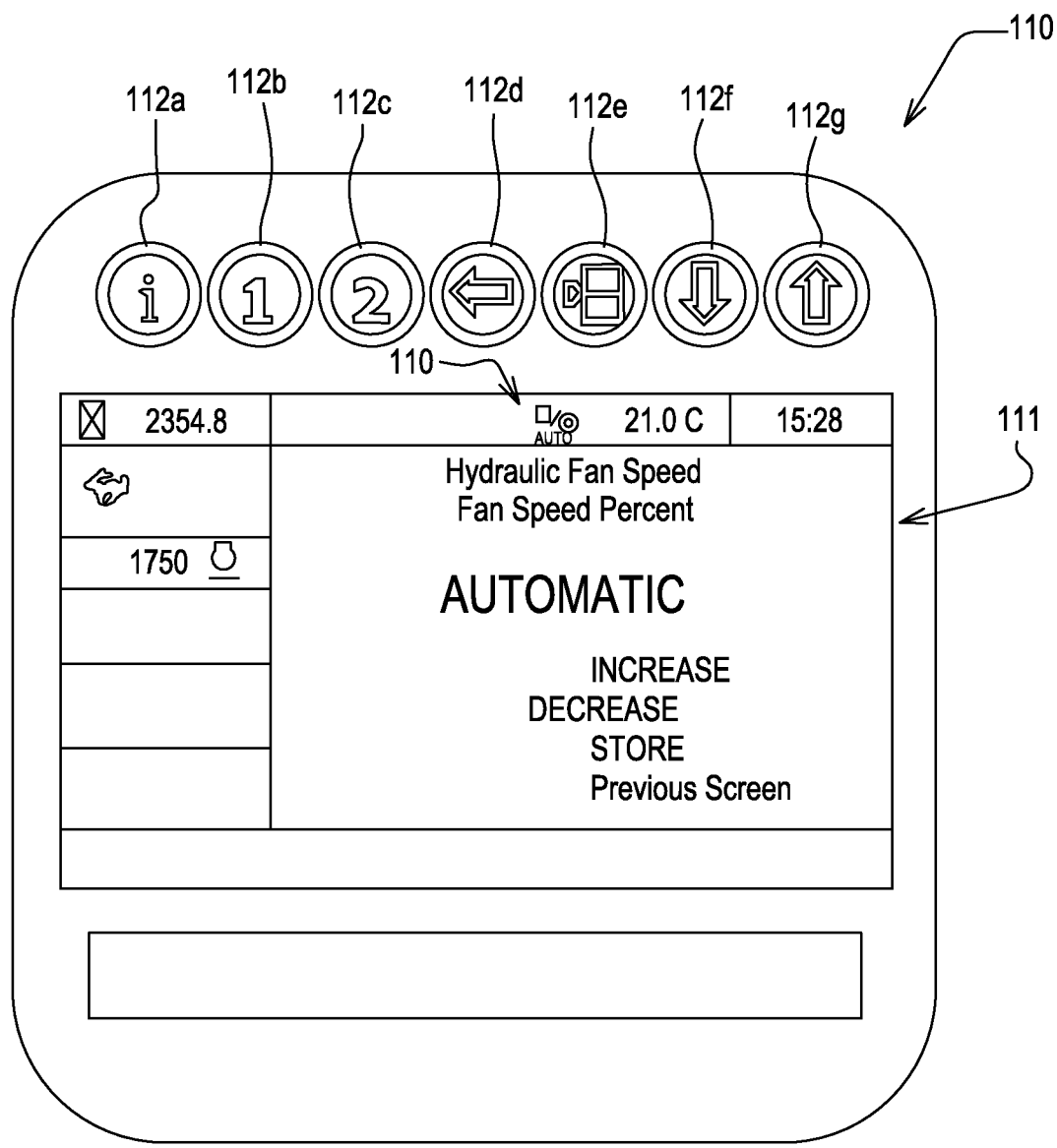
FIG. 5 illustrates a monitor screen with data in the language chosen.

As illustrated in FIG. 3, once a language is selected at step 240, the microcontroller 113 detects the selection and, in step 250, sends a coded signal to the vehicle controller 120 identifying the selected language. In step 250, the vehicle controller (1) may send a coded signal to the display monitor 110 instructing the display monitor 110 to display all text in the selected language; and (2) may send vehicle data values conforming to the text of the language displayed. The display monitor 110 may then display the selected language with conforming data as illustrated in FIG. 5.

As illustrated in FIG. 3, if none of the operational selectors 112a-112e was activated at step 220, then the multi-language display system 100 may, at step 270, display its default startup screen in the language last selected and displayed. Information in all subsequent screens may also be displayed in the language last selected. If a language selector(s) is subsequently operated at step 280, the microcontroller 113 moves to step 230 via software and the multilanguage display system 100 continues through the subsequent steps as illustrated in FIG. 3 and described above.

Having described the preferred embodiment, it will become apparent that various modifications can be made without departing from the scope of the invention as defined in the accompanying claims.

The invention claimed is:

1. A display system for a vehicle, comprising:
a monitor having a display and a plurality of operational selectors in the vehicle, the monitor being configured to display a plurality of language choices in their native text when at least one of the operational selectors is activated for a predetermined length of time; and
a controller in communication with the monitor, the controller being configured to direct the monitor to display vehicle information in one of the languages when a corresponding one of the plurality of language choices is selected by activating at least one of the plurality of operational selectors;
wherein the monitor displays the plurality of language choices in their native text without the need for another activation or combination of activations before or after the activation of the operational selector for the predetermined length of time.

2. The display system of claim 1, wherein the at least one of the plurality of operational selectors is configured to be activated for use with a function on the monitor other than displaying language choices when activated for less than the predetermined length of time.

3. The display system of claim 1, wherein the predetermined length of time is at least five seconds.

4. The display system of claim 1, wherein the plurality of operational selectors comprise a plurality of selection switches.

5. The display system of claim 4, wherein the plurality of selection switches comprise at least one of a plurality of toggle switches, a plurality of buttons, and a plurality of icons.

6. A display system for a work vehicle, comprising:
a monitor having a display and a plurality of operational selectors; and
a controller in communication with the monitor, the controller being configured to direct the monitor to display multiple language choices in their respective languages, the multiple language choices being displayed when at least one of the operational selectors is activated during a startup of the work vehicle
wherein the controller directs the monitor to display multiple language choices in their respective languages without the need for another activation or combination of activations before or after the at least one of the operational selectors is activated during the startup of the work vehicle.

7. The display system of claim 6, wherein the plurality of operational selectors comprise at least one of a plurality of toggle switches, a plurality of buttons, and a plurality of icons.

8. A vehicle having a display system for a vehicle, comprising:
an ignition having an on state and an off state;
a monitor having a display and a plurality of operational selectors, the monitor being configured to display a plurality of language choices in their native text when at least one of the operational selectors is activated when the ignition enters the on state; and
a controller in communication with the monitor, the controller being configured to direct the monitor to display vehicle information in one of the languages when a corresponding one of the plurality of language choices is selected
wherein the monitor displays the plurality of language choices in their native text without the need for another activation or combination of activations before or after the at least one of the operational selectors is activated when the ignition enters the on state.

9. The display system of claim 1, wherein the monitor is configured to display the plurality of language choices in their native text when any one of the plurality of operational selectors is activated for the predetermined length of time.

10. The display system of claim 9, wherein the predetermined length of time is at least five seconds.

11. The display system of claim 6, wherein the controller is configured to direct the monitor to display multiple language choices in their respective languages after the startup of the work vehicle when at least one of the operational selectors is activated for a predetermined period of time.

12. The vehicle of claim 8, wherein the monitor is configured to display the plurality of language choices in their native text when the ignition is in the on state and at least one of the operational selectors is activated for a predetermined length of time.

* * * * *